May 4, 1965     K. H. GRUENBECK ETAL     3,181,671
MAGNETIC VARIABLE TORQUE CLUTCH

Filed Feb. 26, 1962     2 Sheets-Sheet 1

INVENTORS.
KLAUS H. GRUENBECK,
ROBERT L. BROWN,
BY R. H. Himes
ATTORNEY.

INVENTORS.
KLAUS H. GRUENBECK,
ROBERT L. BROWN,
BY
R. H. Himes
ATTORNEY.

United States Patent Office 3,181,671
Patented May 4, 1965

3,181,671
MAGNETIC VARIABLE TORQUE CLUTCH
Klaus H. Gruenbeck, Costa Mesa, and Robert L. Brown, Torrance, Calif., assignors to Hughes Aircraft Company, Culver City, Calif., a corporation of Delaware
Filed Feb. 26, 1962, Ser. No. 175,403
7 Claims. (Cl. 192—84)

This invention relates to a friction clutch and more particularly to a clutch which utilizes a permanent magnet and a solenoid in combination to achieve a torque which may be adjusted from 0 to 100% of the rated torque of the clutch.

Clutches in current use generally employ a spring load to achieve a steady torque, which load may be adjustable and is either released mechanically or by means of an electromagnet. Other types of clutches employ an electromagnet which provides a variable torque and disengagement is achieved by means of a spring. Still other clutches employ various types of permanent magnets to provide a steady torque in conjunction with mechanical devices or electromagnets arranged to be either additive or in opposition thereto to provide variations from this torque. A disadvantage of the aforementioned type of clutches is that they invariably have a steady driving torque or they are heavily spring-loaded which results in high friction when free-running.

It is therefore an object of the present invention to provide an improved variable-torque magnetic clutch.

Another object of the present invention in to provide a magnetic clutch capable of running free in the de-energized position without transmitting any power.

Still another object of the present invention is to provide a magnetic clutch which may be used in conjunction with either high or low speed machines.

Another object of the present invention is to provide a magnetic clutch which may be driven by any type of external transmission device such as chain, belt, gear, gas, water or any kind of fluid or coaxial power source.

A further object of the present invention is to provide a magnetic clutch whereby in the de-energized position the driving and the driven parts are maintained in a non-coupled relationship by means of a permanent magnet.

A still further object of the present invention is to provide a magnetic clutch having an output shaft which does not move in either an axial or radial direction irrespective of whether the clutch is energized or not and irrespective of whether or not the input part is driven or not.

In accordance with the present invention, a ring-shaped permanent magnet is coaxially attached to one side of a clutch disc which in turn is mounted transverse to the longitudinal axis of an output shaft. This output shaft is rotatably mounted along the longitudinal axis of a solenoid that is enclosed by a shell of magnetic material with the exception of the extremity thereof immediately adjacent the magnet. The ring-shaped permanent magnet is provided with an even plurality of magnetic poles periodically spaced around the side thereof farthest from the clutch disc. Also, the exposed side of the clutch disc is covered with a layer of felt, for example, to provide a clutch plate. In addition, a drum having a clutch face provided on an inner flat surface thereof is disposed about the permanent magnet with the clutch face opposite and coextensive with the clutch plate and is rotatably mounted on the solenoid about the longitudinal axis thereof. This drum is provided with an axial movement along the longitudinal axis of the solenoid, at one extremity of which pressure is exerted by the clutch face on the clutch plate and at the remaining extremity the clutch face is slightly separated from the clutch plate so as to rotate freely. In operation, the drum is continuously rotated by means of a belt, for example, in both the energized and de-energized positions. In the de-energized position the ring-shaped permanent magnet attracts and maintains the drum and thence the clutch face away from the clutch plate. In the energized position, however, the solenoid overcomes the effect of the permanent magnet and attracts the drum in a manner such that the clutch face exerts a pressure against the clutch plate in proportion to the current flowing therethrough. In this manner a torque proportional to the current flowing through the solenoid is transmitted to the output shaft attached to the ring-shaped permanent magnet and clutch plate.

The above-mentioned and other features and objects of the present invention and the manner of obtaining them will become more apparent by reference to the following description taken in conjunction with the accompanying drawings, wherein.

Figure 1:
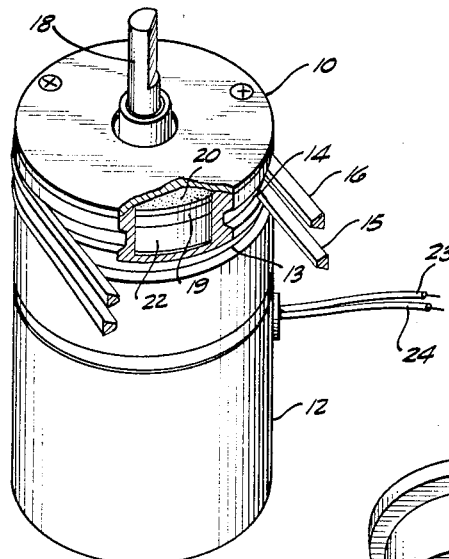
FIG. 1 shows a perspective view of an embodiment of the invention having the drum partially cut away to show the position of the clutch plate and ring-shaped permanent magnet.

Referring now to the drawings, FIG. 1 shows a perspective view of a preferred embodiment of the invention showing the general arrangement of the principal parts thereof. In particular, a drum 10 is rotatably mounted along the longitudinal axis of a solenoid 12. Drum 10 has peripheral grooves 13, 14 adapted to accommodate belts 15, 16, respectively. Further, belts 15, 16 are continuously driven by means of rotating pulleys (not shown), for example, thereby to continuously rotate the drum 10. An output shaft 18 is also rotatably mounted along the longitudinal axis of solenoid 12 and is attached to a clutch disc 19. Clutch disc 19 is provided with a layer of felt 20 on the side thereof immediately adjacent the top, inner, flat surface of the drum 10 as viewed in the drawing and is attached to a ring-shaped permanent magnet 22 on the opposite side thereof. Leads 23, 24 provide an input to the solenoid 12.

Referring now to FIGS. 2–5 of the drawings, wherein like reference numerals refer to like elements, there are shown additional views of the device of FIG. 1. In particular, solenoid 12 includes a thick cylindrical shell 30 constituted of a magnetic material and having a concentrically disposed annular cavity therein for housing a winding 32. A sleeve 34 composed of a non-magnetic material and having an inner bore sufficient to accommodate the output shaft 18 without binding is inserted partially through a center hole disposed axially through the thick shell 30 and rigidly attached thereto. Further, a washer 35 composed of a non-magnetic material is disposed about the sleeve 34 adjacent the center portion of the thick shell 30 for the purpose of preventing the closure of a magnetic circuit therethrough, thus allowing the drum 10 to always rotate freely relative to the solenoid 12. The sleeve 34 is provided with a peripheral groove 36 disposed concentrically about the extremity thereof farthest from the solenoid 12. In the assembly, a spring clip 37 is disposed in the peripheral groove 36 to establish one extremity of the longitudinal movement of the drum 10 along the axis of solenoid 12.

The drum 10 is provided, for example, with a removable disc 38 which covers an annular cavity 39 concentrically disposed in a cylindrical thick shell 40 composed of magnetic material. The shell 40 has a concentric bore therethrough of sufficient diameter to allow the drum 10 to rotate freely about the sleeve 34 which projects from the solenoid 12. In the assembly, the shell 40 is placed over the sleeve 34 followed by a washer 41 and then the snapping in place of the clip 37. Thus, at this stage of the assembly the shell 40 of the drum 10 can be moved longitudinally along the sleeve 34, i.e., the axis of solenoid 12 until stopped by the washer 35 at one extremity or the spring clip 37 at the remaining extremity.

Figure 2:
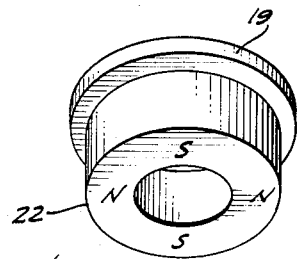
FIG. 2 shows a perspective view of the ring-shaped permanent magnet and clutch disc illustrating the manner in which the magnet is poled.
Figure 3:
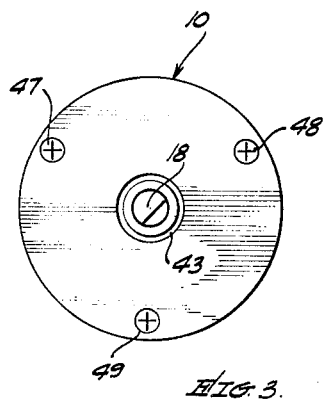
FIG. 3 is a top plan view of the device of FIG. 1.

The next step in the assembly is to attach the clutch disc 19 by any conventional process to the output shaft 18. In this respect it is essential that the surface of the disc 19 be disposed transverse to the longitudinal axis of the output shaft 18. This may be accomplished, for example, by utilizing a collar 43 which is attached to the disc 19 and is, in turn, attached to the output shaft 18 by means of a set-screw 44. The ring-shaped permanent magnet 22 is provided with a cross-sectional configuration to allow it to rotate freely within the annular cavity 39 of shell 40 and is concentrically attached to the underside of disc 19, as viewed in the drawing. Referring specifically to FIG. 2, there is shown a perspective view of the ring-shaped permanent magnet 22 attached to the disc 19. This permanent magnet 22 may be fabricated from a material known commercially as "Ceramagnet A" and is magnetized with an even number of poles such as, for example, two north poles and two south poles uniformly and alternately spaced thereabout. In particular, the magnet 22 is magnetized with the north and south poles running parallel to the axis of rotation thereof. In this respect, one side of permanent magnet 22 may be magnetized stronger than the remaining side in which case the side in contact with the disc 19 is the weaker side. Referring again to FIG. 5, a layer of felt 20 is attached to the opposite surface of the disc 19 by means of an epoxy cement, for example. This layer of felt 20 which provides the clutch face constitutes, for example, a uniformly thick layer of dacron felt which is, in turn, impregnated with graphite. The foregoing assembly composed of output shaft 18, permanent magnet 22 and layer of felt 20 is inserted in the centre bore of the sleeve 34 after which the cover 38 is attached to the shell 40 of drum 10 by means of screws 47, 48 and 49, FIG. 3.

Figure 4:
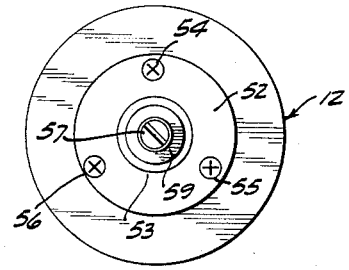
FIG. 4 is a bottom plan view of the device of FIG. 1.

After insertion of the output shaft 18 through the sleeve 34, a cap 50 composed of bronze is sweated on the end of output shaft 18 to prevent disassembly thereof and to provide a bearing surface. Lastly, a flange 52 including a collar 53 having female threads is attached coaxially to the shell 30 of solenoid 12 at the extremity thereof farthest from the drum 10 by means of screws 54, 55, 56 (FIG. 4). A threaded rod 57 is then inserted through the collar 53 of flange 52 to the extent that it bears on cap 50 at the extremity of output shaft 18 and raises and adjusts the distance of the ring-shaped magnet 22 slightly away from the bottom of the annular-shaped cavity 39 in the thick shell 40 of drum 10. The rod 57 is then maintained in this position by means of a lock washer 58 and nut 59 which are placed over the rod 57 in the order named and the nut 59 tightened against the collar 53 of flange 52. In addition to the foregoing, the adjustment of the rod 57 also determines the air gap in the magnetic circuit of solenoid 12 when in the energized state and accordingly can be used to adjust the magnetic field for a specific current flow through solenoid 12.

In operation, the magnetic field produced by the permanent magnet 22 designated by dashed lines 60, 61 thread the bottom portion of the thick shell 40 of drum 10 in a circumferential manner determined by the number of poles contained therein, thereby attracting the shell 40 upwards along the sleeve 34, as viewed in the drawing, until the washer 41 hits against the spring clip 37 in the peripheral groove 36 at the end of sleeve 34. In this position there is still a slight separation between the ring-shaped permanent magnet 22 and the bottom of the annular cavity 39 in drum 10, thus allowing the drum 10 to rotate freely without drag on either the magnet 22 or the output shaft 18 connected thereto. This is the normal deenergized position of the variable torque clutch of the present invention. In this position the drum 10 is rotated continuously by means of the belts 15, 16 which are seated in the peripheral grooves 13, 14, respectively. As explained above, there is substantially no drag on the output shaft 18 when the drum 10 is rotated, provided that the threaded rod 57 is properly adjusted.

Figure 6:
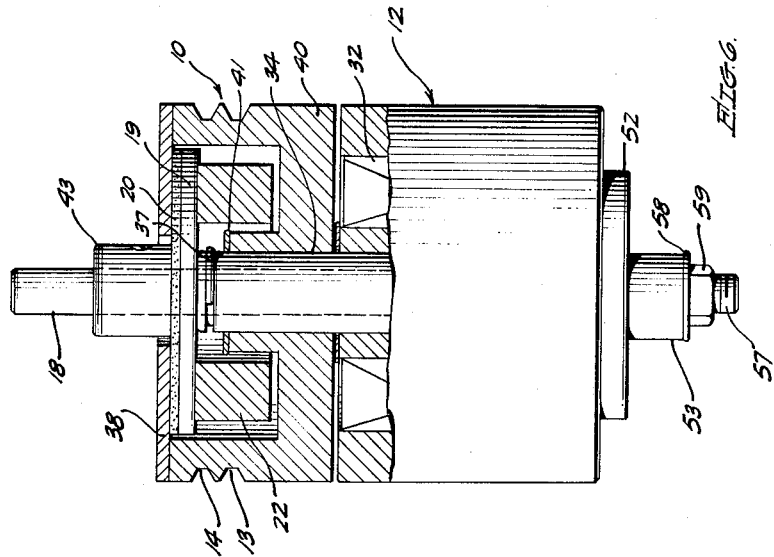
FIG. 6 is a side view partially in section of the device of FIG. 1 in an energized position.
Figure 5:
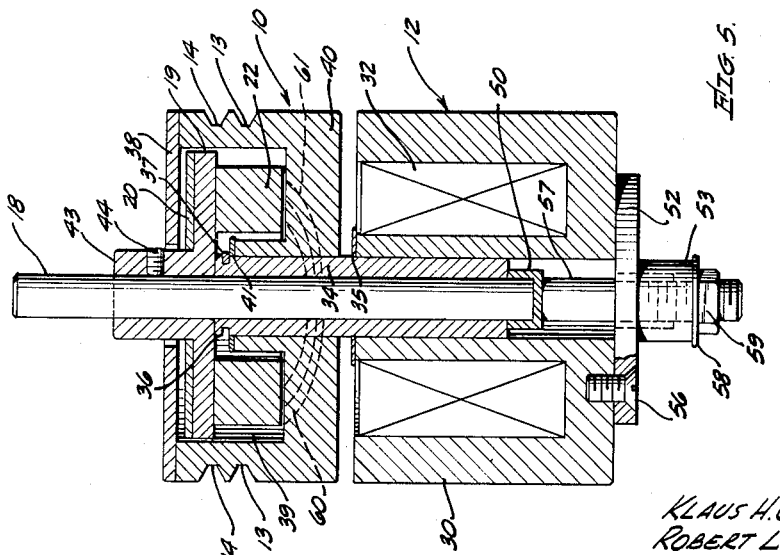
FIG. 5 is a cross-sectional view of the device of FIG. 1 in a de-energized position.

Referring now to FIG. 6 of the drawings, there is shown the position of the drum 10 when the clutch of the present invention is in the energized position. In this position, the winding 32 is energized by means of appropriate current flow therethrough applied through leads 23, 24 to produce a magnetic field along the axis thereof, which magnetic field radially threads thick shell 40 of magnetic material thus attracting the rotating drum 10 towards the washer 35 at the opposite extremity of its longitudinal movement relative to the deenergized position thereof without neutralizing or cancelling the magnetic field of permanent magnet 22. Prior to reaching the washer 35, however, the layer of felt 20 on the face of clutch disc 19 engages the inner surface of the cover 38 which is secured over the annular cavity 39 of the thick shell 40 of drum 10. The force which the cover 38 exerts on the layer of felt 20 is determined by the relative strength of the substantially orthogonal magnetic fields threading the shell 40 of drum 10 which, in turn, are determined by the permanent magnet 22 and the ampere-turns generated by the winding 32. Inasmuch as the number of turns must necessarily remain fixed after fabrication of the winding 32, the net force exerted by the cover 38 on the layer of felt 20 is substantially a function of the current flowing through the winding 32. Thus, as the cover 38 comes in contact with the layer of felt 20, the drag therebetween transmits the rotating motion of the drum 10 to the output shaft 18. Further, as current flow through the winding 32 progressively increases, the force exerted by cover 38 on the layer of felt 20 becomes increasingly greater, allowing correspondingly less slippage between the drum 10 and the output shaft 18. Ultimately, when rated current flows through the winding 32, substantially all of the torque applied to the drum 10 is transmitted to the output shaft 18. As previously noted, the threaded rod 57 may be adjusted in a manner to provide an optimum range of torque for a specific configuration of winding 32.

Although the invention has been shown in connection with a certain specific embodiment, it will be readily apparent to those skilled in the art that various changes in form and arrangement of parts may be made to suit requirements without departing from the spirit and scope of the invention. By way of example, it is apparent that the layer of felt 20 may be cemented to the inner surface of cover 38 rather than on the disc 19 and still achieve the same effect. In this latter case there is a possible advantage to be gained in the maintenance of the device. Also, separate permanent magnets may be employed in lieu of the ring-shaped permanent magnet 22 and these magnets may be attached to the drum 10 rather than the disc 19, although it is not recommended that the magnets be required to support their own weight.

What is claimed is:

1. An electro-mechanical clutch comprising:
   (a) an output shaft rotatably mounted at a fixed position along a predetermined axis, said output shaft being provided with a disc providing a surface of revolution about said shaft;
   (b) an element rotatably mounted about said shaft with an axis of rotation along said predetermined axis, said element having an inner surface in a parallel plane spaced from said surface of revolution of said disc and having a portion thereof on the opposite side of said surface of revolution on said disc composed of material of permeability greater than unity;

(c) means including a permanent magnet attached to said disc on the side thereof opposite from said surface of revolution for generating a first magnetic field in a predetermined direction through said portion of said element thereby to normally maintain said inner surface of said element spaced from said surface of revolution of said disc;

(d) means disposed intermediate said surface of revolution of said disc and said inner surface of said element for providing a uniform drag in response to and in proportion to the magnitude of a force bringing said surface of revolution of said disc and said inner surface of said element together;

(e) means coupled to said element for rotating said element about said predetermined axis; and (f) means including a solenoid for generating a second magnetic field through said portion of said element from the side thereof farthest from said permanent magnet and in a direction substantially orthogonal to said predetermined direction thereby to attract said element in a direction to move said inner surface thereof towards said surface of revolution of said disc whereby torque is transmitted to said output shaft in proportion to the intensity of said second magnetic field.

2. An electro-mechanical clutch comprising:

(a) means including a solenoid disposed about a predetermined axis for producing a first magnetic field extending radially therefrom;

(b) an output shaft rotatably mounted at a fixed position along said predetermined axis, said output shaft having a disc coaxially and transversely attached thereto;

(c) an element rotatably mounted about said output shaft and being capable of being moved longitudinally therealong, said element having an inner, flat surface equidistant from, coextensive with and adjacent said disc and having at least a portion thereof intermediate said solenoid and said disc composed of material of permeability greater than unity;

(d) means including a permanent magnet disposed intermediate said disc and said portion of said element for producing a second magnetic field that is substantially orthogonal to said radial magnetic field in said element to normally maintain said inner, flat surface thereof spaced from said disc;

(e) means disposed intermediate said disc and said inner flat surface of said element for providing a uniform drag proportion to and in response to the magnitude of a force bringing said disc and said inner, flat surface together;

(f) means coupled to said element for rotating said element about said predetermined axis; and (g) means for electrically exciting said solenoid thereby to generate said first magnetic field of an intensity no less than that required to overcome the forces of attraction developed by said permanent magnet thereby to develop a determinable drag between said disc and said inner, flat surface and transmit at least a portion of the angular velocity of said element to said output shaft.

3. The electro-mechanical clutch as defined claim 2 wherein said permanent magnet has a rectangular toroidal configuration and is attached coaxially to said disc on the side thereof facing said portion of said element and is magnetized with an even plurality of poles uniformly and alternately spaced therearound on the side thereof parallel to and farthest from said disc.

4. Said electro-mechanical clutch as defined in claim 2 wherein said means disposed intermediate said disc and said inner, flat surface of said element for providing a uniform drag proportional to and in response to the magnitude of a force bringing said disc and said inner, flat surface together constitutes a layer of compressible material cemented on the side of said disc facing said inner, flat surface of said element.

5. Said electro-mechanical clutch as defined in claim 4 wherein said layer of compressible material additionally includes graphite impregnated therein.

6. An electro-mechanical clutch comprising:

(a) a solenoid disposed coaxially about a predetermined axis for producing a radial magnetic field at one extremity thereof in response to electrical excitation;

(b) means for providing a bearing surface of revolution along said predetermined axis facing said one extremity of said solenoid;

(c) an output shaft rotatably mounted along said predetermined axis and having an extremity thereof in contact with said bearing surface of revolution, said output shaft having a disc coaxially attached at right angles thereto;

(d) a cylindrical element rotatably mounted about said output shaft and being capable of being moved longitudinally therealong, said cylindrical element having an inner, flat surface in a parallel plane spaced from said disc and being composed of material of permeability greater than unity;

(e) rectangular toroidal permanent magnet disposed symmetrically about said output shaft and attached to said disc on the side thereof farthest from said inner, flat surface of said cylindrical element for generating an additional magnetic field that is substantially orthogonal to said radial magnetic field in said element to normally maintain said inner, flat surface of said cylindrical element spaced from said disc;

(f) a layer of felt disposed over at least a portion of said disc for providing a uniform coefficient of friction against said inner, flat surface of said cylindrical element;

(g) means coupled to the outer periphery of said cylindrical element for rotating said element at a constant angular velocity; and (h) means for applying electrical excitation to said solenoid thereby to cause said cylindrical element to engage said layer of felt on said disc thereby to transmit torque to said output shaft.

7. The electro-mechanical clutch as defined in claim 6 wherein said permanent magnet is magnetized with first and second north poles and first and second south poles alternately and uniformly spaced about the one side of said rectangular toroidal configuration farthest from and parallel to said disc and said one side is, in the absence of said radial magnetic field at said one extremity of said solenoid, disposed closely adjacent but not in contact with said cylindrical element.

References Cited by the Examiner
UNITED STATES PATENTS

| | | |
|---|---|---|
| Re. 19,150 | 5/34 | Furnas. |
| 1,681,371 | 8/28 | Slade. |
| 1,971,618 | 8/34 | Norton. |
| 2,134,181 | 10/38 | Geyer et al. |
| 2,135,126 | 11/38 | Harwood. |
| 2,612,248 | 9/52 | Fiertag. |

DAVID J. WILLIAMOWSKY, *Primary Examiner.*

THOMAS J. HICKEY, *Examiner.*